Aug. 23, 1960  K. GEBELE  2,949,835
PHOTOGRAPHIC CAMERA HAVING DEPTH OF
FIELD INDICATING MEANS
Filed Jan. 30, 1956  2 Sheets-Sheet 1

Aug. 23, 1960   K. GEBELE   2,949,835
PHOTOGRAPHIC CAMERA HAVING DEPTH OF
FIELD INDICATING MEANS
Filed Jan. 30, 1956   2 Sheets-Sheet 2
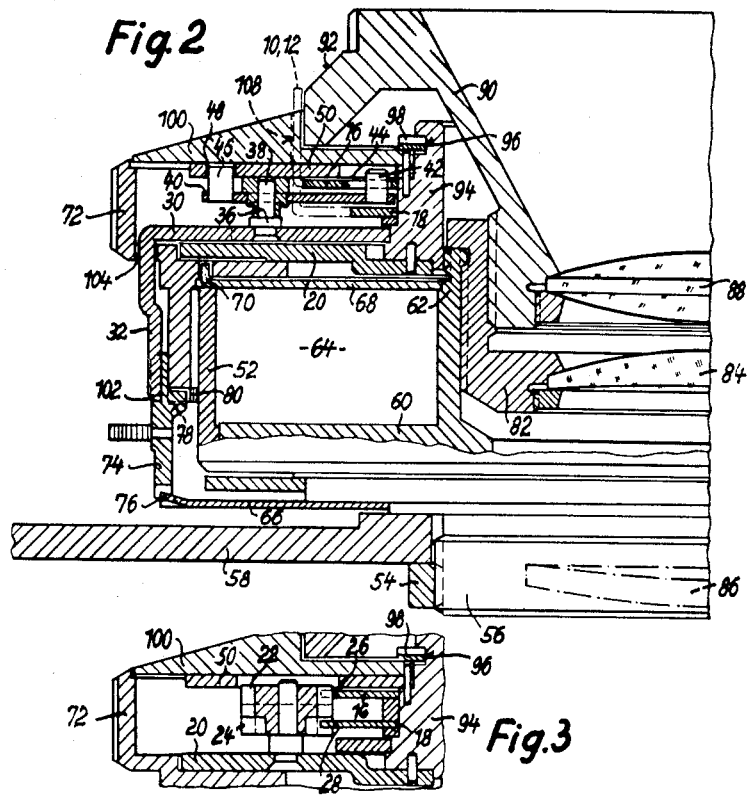
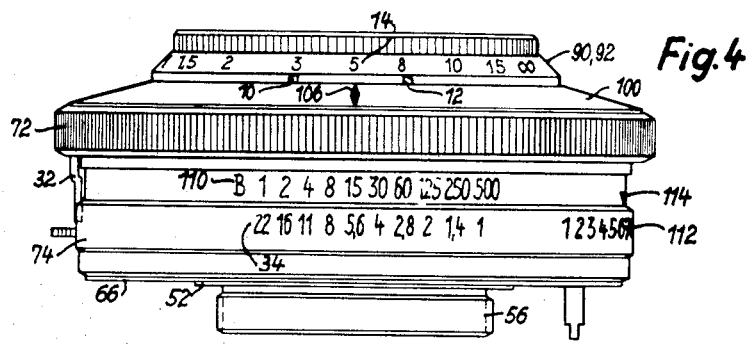

United States Patent Office 2,949,835
Patented Aug. 23, 1960

2,949,835

PHOTOGRAPHIC CAMERA HAVING DEPTH OF FIELD INDICATING MEANS

Kurt Gebele, Munich, Germany, assignor, by mesne assignments, to Compur-Werk Friedrich Deckel OHG, Munich, Germany, a firm of Germany Filed Jan. 30, 1956, Ser. No. 562,346

Claims priority, application Germany Feb. 1, 1955

5 Claims. (Cl. 95—64)

The present invention relates to a photographic camera, and more particularly to a camera having a depth of field indicator for indicating or showing, with reference to the focusing distance scale, the maximum and minimum distances of objects which will appear in acceptably sharp focus.

An object of the invention is the provision of a generally improved and more satisfactory camera of this kind.

Another object is the provision of a camera so designed and constructed that the various setting and indicating members, as well as the scales cooperating with them, lie relatively close together for easy manipulation and easy reading.

Still another object is the provision of an improved and more satisfactory camera having a shutter casing or housing mounted in fixed position on the camera, a focusing lens mount movably carried by the shutter casing and projecting forwardly from the shutter casing, and depth of field indicating means located forwardly of the shutter casing and in close proximity to the projecting part of the lens mount.

A further object is the provision of a shutter unit comprising a shutter casing to be mounted in fixed position on the camera body, and a lens mount carried by and projecting slightly forwardly from the shutter casing, the parts being so designed and constructed as to be particularly compact, as well as having a neat and attractive appearance and a rounded shape acceptable to the purchasing public under present conditions.

These and other desirable objects may be attained in the manner disclosed as an illustrative embodiment of the invention in the following description and in the accompanying drawings forming a part hereof, in which:

Fig. 2 is a fragmentary section taken axially and radially through the shutter and lens unit and a part of the front wall of the camera body;

Fig. 3 is a view similar to a portion of Fig. 2, on a different plane, illustrating additional details;

Fig. 4 is a top plan view of the shutter and lens unit, on a larger scale than Fig. 1.

The same reference numerals throughout the several views indicate the same parts.

Figure 1:
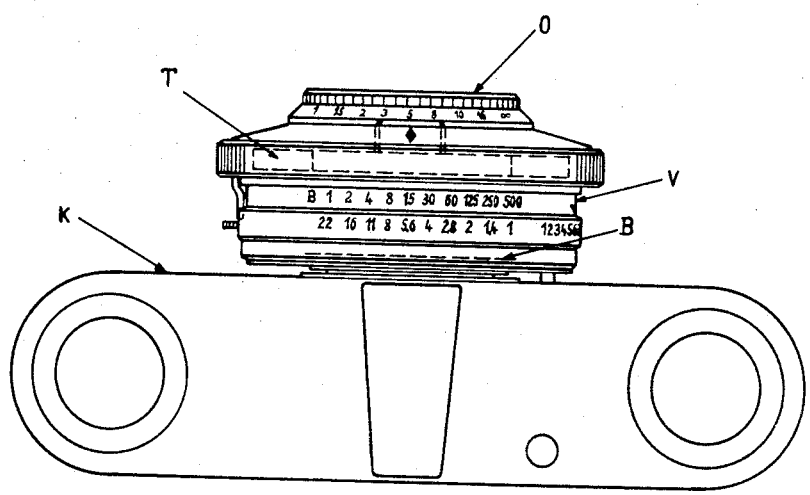
Fig. 1 is a top plan view, somewhat diagrammatic, of a camera equipped with a shutter and lens unit in accordance with a preferred embodiment of the present invention.

Referring first to Fig. 1, there is shown a camera having a body K, to the front of which there is firmly fixed a shutter indicated in general at V, which forms the stationary support for a movable or focusing lens mount O, which is adjustable forwardly and backwardly in the direction of the optical axis. Within the shutter is an adjustable diaphragm or stop B, and a depth of field indicator T, the latter being supported in front of the true shutter casing, between it and an overlying stationary part. The shutter casing and the lens mount supported thereby, together with their associated parts, may all be referred to collectively as the shutter unit.

Referring now to the other views, and especially to Fig. 2, the shutter casing or housing 52 is provided with the usual rearwardly projecting circular flange 56, concentric with the optical axis and usually called the rear lens tube whether there is actually a lens element mounted therein or not, which lens tube projects through an opening in the front wall 58 of the camera body and is secured therein by means of a nut 54 screwed on external screw threads of the tube 56. Within the shutter housing 52 there is fixed a base plate 60 having a front lens tube 62. In the annular space 64 between the front lens tube 62 and the outer cylindrical wall of the shutter casing there is arranged the usual shutter operating mechanism for opening and closing the shutter blades in the usual way. The details of the shutter mechanism are not important for purposes of the present invention, and may be widely varied. Typical examples of suitable shutter mechanism which may be used are disclosed in the copending United States patent applications of Kurt Gebele, Serial No. 514,218, filed June 9, 1955, now Patent No. 2,900,885 and Serial No. 520,875, filed July 8, 1955 now Patent No. 2,900,886. The shutter is cocked or tensioned, and released or triggered, when making an exposure, in suitable known manner such as through the shaft 65 having its axis parallel to but offset laterally from the optical axis, and extending out the back of the shutter and operatively connected to suitable control parts within the camera body, as for example in the manner disclosed in said copending applications.

In addition to the shutter blades which move to open and close the light aperture for making an exposure, the shutter is also equipped with the usual adjustable diaphragm or stop, such as an iris diaphragm, the leaves or blades of which are located near the rear of the shutter unit and are not seen in Fig. 2 but are indicated diagrammatically at B in Fig. 1. The diaphragm leaves are adjusted in the usual manner, to vary the size of the diaphragm aperture, by means of a diaphragm setting ring 66 rotatably supported on the rear part of the shutter housing 52.

Near the front of the shutter housing, there is rotatably mounted a ring 68 for setting the shutter speed or duration of exposure. In the present structure, this ring 68 is an internal ring, not directly accessible, but carries an ear 70 extending into a notch in an external and accessible setting ring 72 rotatably mounted on the outside of the shutter casing 52 and provided with a circumferentially extending rib which is knurled or roughened for easy grasping by the operator. Turning of the external speed setting ring 72 serves, through the rear or tongue 70, to cause corresponding turning of the internal speed setting ring 68, to adjust the speed of the exposure.

As readily seen in Fig. 2, the external speed setting ring 72 has a rearwardly extending circumferential skirt or flange, the rear portion of which is surrounded and overlapped by a coupling ring 74 of generally cylindrical shape. The rear edge of the ring 74 has a notch engaged with an ear or driving tongue 76 on the diaphragm setting ring 66. The diaphragm setting ring is somewhat springy or resilient, and tends to push the coupling ring 74 axially forwardly, so as to keep a tooth 78 thereon engaged or seated in one or another of the notches 80 formed in the rear edge of the speed setting ring 72. However, when reasonable rearward force is applied to the coupling ring 74, the diaphragm setting ring 66 is flexed rearwardly and the tooth 78 may be disengaged from the notches 80, so that the ring 74 may be turned to a different relative position of orientation with respect to the speed setting ring 72, and then may move forwardly again to engage the tooth 78 in another one of the notches 80.

Within the front lens tube 62 there is tightly screwed a bushing 82 in which is mounted a stationary lens component 84. If it is desired to have more than one stationary lens component, another one may be mounted at 86 in the rear lens tube 56. The movable component 88 of the lens (axially movable for focusing) is held in the threaded mount 90, which is threaded into internal threads in the bushing 82 so that when the focusing mount 90 is turned, the screw threaded connection with the fixed bushing 82 will cause the mount 90 to move axially forwardly or rearwardly.

A conical portion 92 on the exterior of the lens mount 90 carries the focusing distance scale 14, graduated in suitable units of distance such as meters or feet (meter graduations being illustrated) and read in conjunction with a fixed index mark or pointer 106 on the relatively flat conical front face of a fixed ring 100. For supporting this ring 100 as well as various other parts, from the stationary parts of the shutter casing, there is an annular ring or tube 94 tightly threaded to the front end of the front lens tube 62, which ring 94 is provided near its front end with an external circumferential groove 96. The annular plate 100 surrounds the tube 94 near the groove 96, and is pressed rearwardly by an annular or ring-shaped spring 98 of corrugated shape which has its inner edge seated in the groove 96 and its outer edge overlying the inner edge of the plate 100. Suitable means, such as pins or screws, hold the parts 94 and 100 against any turning movement relative to each other.

Figure 5:
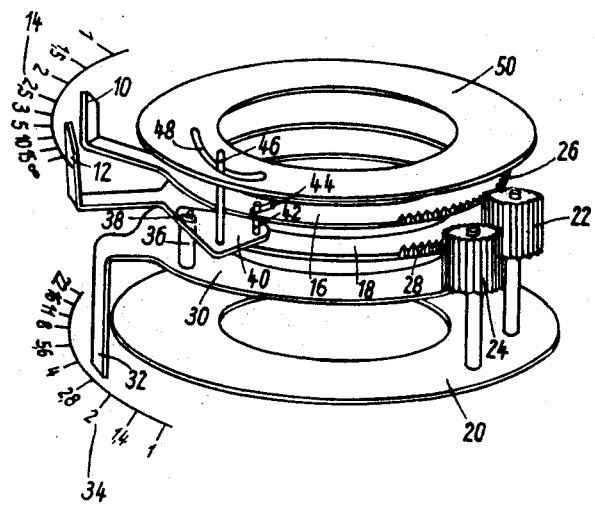
Fig. 5 is a perspective view illustrating diagrammatically the construction of the depth of field indicating means.

A stationary annular plate 20, secured to the stationary tube 94, extends across the front of the shutter casing and is axially spaced rearwardly from the stationary plate 100. According to the present invention, the depth of field indicating mechanism is mounted in the space between the plates 20 and 100. Referring now to the diagrammatic perspective constituting Fig. 5, as well as to the sectional views, Figs. 2 and 3, the depth of field indicator comprises two pointers 10 and 12 which extend out through an arcuate slot 108 in the plate 100, in a position to sweep over and be read in conjunction with the focusing distance scale 14. These pointers 10 and 12 are formed as arms on two pointer rings 16 and 18 axially spaced from each other and rotatable circumferentially on the outer periphery of the fixed tube or ring 94. Reversing gearing is provided so that the two rings 16 and 18 turn through equal amounts in opposite directions. To this end, the stationary plate 20 carries two parallel shafts on which pinions 22 and 24 are rotatably mounted in axially staggered relation to each other, as seen in Figs. 3 and 5. The two pinions mesh with each other. Also the pinion 22 meshes with gear teeth 26 on part of the periphery of the front pointer ring 16, while the pinion 24 meshes with gear teeth 28 on part of the periphery of the rear pointer ring 18.

The depth of field indicator is driven from the movements of the diaphragm adjusting ring 66. For this purpose, the depth of field indicator includes a setting ring 30 rotatable on the tube 94 and located to the rear of the pointer ring 18 and in front of the fixed plate 20. This setting ring 30 has a rearwardly bent lug or finger 32 which extends through an arcuate slot 104 in the speed setting ring 72 and enters an axial groove or notch 102 in the coupling ring 74. Since the coupling ring, in turn, is coupled at all times to the diaphragm aperture setting ring 66 to turn therewith, it follows that any turning movement of the diaphragm aperture setting ring will be transmitted through the arm 32 to the setting ring 30 of the depth of field indicating mechanism.

The diaphragm aperture setting ring 66 has been omitted from Fig. 5 for the sake of clarity, but the setting ring 30 and its arm 32 are diagrammatically shown, the latter in conjunction with a diaphragm aperture scale linearly graduated and shown symbolically at 34. But since the changes in depth of field, as read on the scale 14, bear a non-linear relation to the changes in aperture as read on the linear scale 34, it is desirable for the sake of accurary to interpose non-linear transmission means between the setting ring 30 on the one hand and the depth of field pointer rings 16 and 18 on the other hand.

This non-linear transmission means or transforming means includes a pin 36 fixed to the setting plate 30, the forward end 38 of the pin constituting a pivot for one end of a swing plate 40 lying in a transverse plane between the pointer rings 16 and 18. The other end of the plate 40 carries a forwardly projecting pin 42 which extends into a radial slot 44 in the pointer ring 16. The swing plate 40 also carries a control pin 46 which extends forwardly into a control cam slot 48 in a stationary ring 50 which is mounted on the stationary tube 94 just behind the stationary plate 100.

As the setting ring 30 turns in one direction or the other, the swing plate 40 will move bodily with it and its motion will be transmitted through the drive pin 42 to the ring 16. However, during this movement of the ring 30 and plate 40, the control pin 46 will be carried along to different points in the cam slot 48, and the cam slot will swing the plate 40 as required, in one direction or the other on its pivot 38, thereby impressing or introducing a slightly non-linear or non-uniform motion on the movements of the pointer ring 16 relative to the movements of the ring 30, to any extent required by the characteristics of the lens and the spacing of the graduations of the diaphragm aperture scale 34 with relation to those of the focusing distance scale 14. The shape of the control cam groove 48 can be designed so as to meet any desired conditions of non-uniformity or non-linear relationship between the turning movements of the rings 30 and 16, in order to give accurate results.

In addition to the focusing distance scale 14 and the diaphragm aperture scale 34, both previously mentioned and both cooperating with and read in conjunction with the same main reference mark or pointer 106 on the stationary member 100, there is also a shutter speed scale 110 marked on the rearwardly extending flange of the shutter speed setting ring 72, and likewise read from the same main reference mark 106. It is desirable also to provide an exposure value scale 112 marked on the coupling ring 74 and read in conjunction with a reference mark 114 on the speed setting ring 72, which scale 112 will show the relative position of orientation of the shutter speed setting member and the diaphragm aperture setting member with respect to each other, at all times, regardless of the absolute positions of either of these members.

As a typical example, Fig. 4 shows the parts of the shutter unit set for a diaphragm aperture of *f*:5.6, at a shutter speed of 1/15 of a second, and with the lens focused for a distance of 5 meters. The depth of field pointers 10 and 12 also show that all objects between a distance of 3 meters and a distance of 8 meters will be in acceptably sharp focus.

When the exposure value scale 112 is present and when the depth of field indicator is also present, all the useful information which the photographer can derive from the diaphragm aperture scale 34 is given to him in even better and more usable form by the depth of field indicator in conjunction with the exposure value scale. Therefore, the diaphragm aperture scale 34 may be entirely omitted without detracting from the usefulness of the device.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims. For instance, the shutter casing itself may be installed inside the camera body instead of projecting forwardly from the front wall thereof, in which case the focusing lens mount can secure its stationary support directly from the front of the camera body. Or again, the axial focusing movement of the movable lens component is not necessarily derived from the screw threaded arrangement shown, but may be secured from worm gearing, or a rack and pinion arrangement, or other known forms of mechanism for moving lenses axially for focusing purposes. Again, the depth of field indicator may be constructed in other forms, and the coupling of the rotary movement of the diaphragm aperture setting member to the shutter speed setting member can be of different form or even entirely eliminated.

What is claimed is:

1. A photographic shutter unit including a shutter housing, a front lens tube mounted in stationary position within said housing, an extension tube stationarily secured to and projecting forwardly from said front lens tube, an axially movable focusing lens mount supported from said front lens tube, a focusing distance scale carried by said focusing lens mount, a depth of focus indicator mounted on said extension tube and cooperating with said distance scale, a shutter speed setting member movably mounted on said shutter housing near the front thereof, a diaphragm aperture setting member movably mounted on said shutter housing near the rear thereof, a coupling ring for selectively coupling said shutter speed setting member to said aperture setting member in any one of a plurality of possible positions with respect to each other, and means operating said depth of focus indicator from said coupling ring.

2. A photographic shutter unit including a shutter housing, a stationary plate connected to and spaced forwardly from said shutter housing, a front lens component axially movable relative to said shutter housing for focusing, means including a rotatable ring manually accessible at the front of said plate for moving said lens component axially to focus it, a focus distance scale carried by said ring, slot means in said stationary plate, a pair of depth of field indicating pointers mounted behind said plate and extending forwardly through said slot means into cooperative relation to said scale, diaphragm adjusting means rotatably mounted on said shutter housing, means operatively connecting said pointers to said diaphragm adjusting means to rotate said pointers from rotation of said diaphragm adjusting means, said connecting means including transmission means located in the space between said plate and said shutter housing for rotating said pointers to a different angular extent than that of said diaphragm adjusting means, a member rotatably mounted on said shutter housing for adjusting shutter speed, and a coupling ring for adjustably coupling said diaphragm adjusting means to said shutter speed adjusting member to rotate therewith in any selected one of a plurality of positions of relative orientation, said coupling ring constituting part of said means connecting said pointers to said diaphragm means.

3. A photographic shutter unit including a shutter housing, a stationary plate connected to and spaced forwardly from said shutter housing, a front lens component axially movable relative to said shutter housing for focusing, means including a rotatable ring manually accessible at the front of said plate for moving said lens component axially to focus it, a focus distance scale carried by said ring, slot means in said stationary plate, a pair of depth of field indicating pointers mounted behind said plate and extending forwardly through said slot means into cooperative relation to said scale, diaphragm adjusting means rotatably mounted on said shutter housing, means operatively connecting said pointers to said diaphragm adjusting means to rotate said pointers from rotation of said diaphragm adjusting means, a member rotatably mounted on said shutter housing for adjusting shutter speed, and a coupling ring for adjustably coupling said diaphragm adjusting means to said shutter speed adjusting member to rotate therewith in any selected one of a plurality of positions of relative orientation, said coupling ring constituting part of said means connecting said pointers to said diaphragm means.

4. A photographic shutter unit of the front lens focusing type, comprising an annular shutter mechanism housing, an annular plate mounted in stationary relation to said housing and spaced forwardly therefrom, a front lens mount projecting forwardly beyond said plate and rotatable with respect to said plate for focusing, a focus distance scale extending circumferentially on said mount, and a diaphragm aperture adjusting ring rotatably mounted on said housing near the rear thereof, characterized by a pair of depth of field pointer rings rotatably mounted in the space between said housing and said annular plate, an arcuate slot in said plate, a pointer on each of said pointer rings extending forwardly through said slot to a visible position adjacent said focus distance scale, gearing within said space between said housing and said plate for operatively connecting said two pointer rings to each other to turn through equal amounts in opposite directions, so that when said pointer rings are turned said pointers will sweep in opposite directions over said focus distance scale, and connecting means for driving said pointer rings from turning movements of said aperture adjusting ring.

5. A photographic shutter unit of the front lens focusing type, comprising an annular shutter mechanism housing, an annular plate mounted in stationary relation to said housing and spaced forwardly therefrom, a front lens mount projecting forwardly beyond said plate and rotatable with respect to said plate for focusing, a focus distance scale extending circumferentially on said mount, and a diaphragm aperture adjusting ring rotatably mounted on said housing near the rear thereof, said distance scale having a non-linear relation to turning movements of said aperture adjusting ring which produce a given change in depth of field in terms of the distances indicated by said distance scale, characterized by an arcuate slot in said annular plate, a pair of depth of field pointer rings rotatably mounted in the space between said housing and said plate, a pointer on each of said pointer rings extending forwardly through said slot to a visible position adjacent said focus distance scale to sweep over said scale when its pointer ring is turned, and driving means for driving said pointer rings simultaneously in opposite directions from turning movements of said aperture adjusting ring, said driving means including non-linear transmission means located in said space between said housing and said annular plate.

References Cited in the file of this patent

UNITED STATES PATENTS

| | | |
|---|---|---|
| 2,256,373 | Crumrine | Sept. 16, 1941 |
| 2,315,977 | Mihalyi | Apr. 6, 1943 |
| 2,342,819 | Priesemann | Feb. 29, 1944 |
| 2,350,009 | Babcock et al. | May 30, 1944 |
| 2,472,586 | Harvey | June 7, 1949 |

FOREIGN PATENTS

| | | |
|---|---|---|
| 139,562 | Austria | Nov. 26, 1934 |
| 1,028,877 | France | Mar. 4, 1953 |
| 1,111,448 | France | Oct. 26, 1955 |